United States Patent
White et al.

[19]

[11] Patent Number: 6,159,519
[45] Date of Patent: Dec. 12, 2000

[54] METHOD FOR SUPPLYING STEAM TO A GRAIN PROCESSOR

[75] Inventors: Stanley B. White, Wooster; John D. Menches, Uniontown, both of Ohio

[73] Assignee: Buckeye Feed Mills, Inc., Dalton, Ohio

[21] Appl. No.: 09/069,267

[22] Filed: Apr. 29, 1998

[51] Int. Cl.[7] ....................................... A23L 1/00
[52] U.S. Cl. ........................ 426/510; 426/511; 426/520
[58] Field of Search .................... 426/510, 511, 426/520, 805; 99/483

[56] References Cited

U.S. PATENT DOCUMENTS

| | | | |
|---|---|---|---|
| 2,947,632 | 8/1960 | Kruse | 426/630 |
| 3,573,924 | 4/1971 | Zarow | 426/630 |
| 3,932,736 | 1/1976 | Zarow et al. | 99/487 |
| 4,001,452 | 1/1977 | Williams | 426/454 |
| 4,183,675 | 1/1980 | Zarow | 366/144 |
| 4,256,771 | 3/1981 | Henderson et al. | 426/250 |
| 5,271,893 | 12/1993 | Newman | 422/26 |
| 5,427,810 | 6/1995 | Vorwerck et al. | 426/510 |
| 5,451,423 | 9/1995 | Noel | 426/510 |
| 5,598,770 | 2/1997 | Campbell et al. | 99/487 |

*Primary Examiner*—George C. Yeung
*Attorney, Agent, or Firm*—Barnes & Thornburg

[57] ABSTRACT

A method for hydrothermal processing of a raw grain composition for production of food or animal feeds is provided. The method includes the steps of contacting a raw grain composition in a conditioning chamber with steam produced from boiler water in a boiler and delivered through a conduit including a pressure-reduction valve and through a steam inlet on the conditioning chamber. The method further includes the step of selecting the pressure-reduction valve to reduce the pressure in the conduit downstream of the valve to a value of no less than 30% of the boiler pressure. The method also includes the step of sizing the conduit so that stoichiometric amounts of steam can be delivered to the conditioning chamber at a linear velocity in the conduit of about 8,000 to about 12,000 feet per minute measured downstream of the pressure-reduction valve.

38 Claims, 1 Drawing Sheet

METHOD FOR SUPPLYING STEAM TO A GRAIN PROCESSOR

BACKGROUND AND SUMMARY OF THE INVENTION

This invention relates to hydrothermal processing of a raw grain composition, and particularly to generation of steam suitable for use in processing grain. More particularly, this invention relates to an apparatus and a method for supplying steam to process a raw grain composition.

Grain and other starch-containing material have been processed for centuries to allow starch, which is a major nutritional component of grain, to be digested more readily by animals and humans. Currently, most industrial grain-processing methods treat a raw grain composition in either a steam chest or a pellet-mill conditioning chamber with either hot or cold water, dry heat, or steam or a combination of water, heat, and steam to gelatinize and plasticize the raw grain composition somewhat to provide a partly-processed grain composition.

Typically, operators of grain-processing systems determine the moisture content of the raw grain composition to be processed and then add a predetermined amount of moisture and heat to process the raw grain composition to produce a grain product. However, most of the moisture applied to this raw grain composition coats the surface of grain particles in the raw grain composition, and little of the moisture is actually absorbed into interior regions of the grain particles. Often too little or too much moisture is added inadvertently to the raw grain composition during conventional processing because little attention has been focused on the amount of moisture absorbed by the grain particles.

If insufficient moisture is absorbed by the grain particles, the raw grain composition used to make grain food product is not sufficiently plastic; food production costs escalate, and product quality decreases. For example, when a raw grain composition is processed in a pellet-mill conditioning chamber, the resulting partly-processed grain composition is forced through small orifices in a pellet-mill die to provide a pelletized product. A dry grain composition, i.e., one that is not sufficiently plastic, can not be forced easily through the orifices in the pellet-mill die. Additional energy and, therefore, additional costs are required to force the dry grain composition through the orifices in the mill die. Furthermore, the abrasive nature of a dry grain composition wears out the pelletizing equipment much faster than a partly-processed grain composition that is sufficiently plastic. Forcing the dry grain composition through the orifices in the pellet-mill die can overheat the dry grain composition and provide a pelletized product having an undesirable glazed surface.

A raw grain composition that includes whole grain kernels can be processed in a steam chest; the resulting partly-processed grain composition is then forced between two large rollers in a flaking mill to produce a grain flake. A dry grain composition will not be sufficiently plastic and will be crushed between the two large rollers in the flaking mill. Whether the feed product is a pellet or a flake if it is too dry, it crumbles producing fines, which are not eaten by animals.

Conversely, if too much moisture is added to the raw grain composition during processing to increase the plasticity of the partly-processed grain composition, the pellet mill becomes clogged with a wet grain composition that hydroplanes on the rollers in the mill. Grain processing must be halted while the pellet mill is cleaned out. In addition, when the wet grain is used to prepare a feed product, the resulting feed product molds before it can be consumed.

According to the present invention, a method is provided for hydrothermal processing of a raw grain composition for production of food or animal feeds. The method includes the steps of contacting a raw grain composition in a conditioning chamber with steam produced from boiler water in a boiler and delivered through a conduit including a pressure-reduction valve and through a steam inlet on the conditioning chamber. The method further includes the step of selecting the pressure-reduction valve to reduce the pressure in the conduit downstream of the valve to a value of no less than 30% of the boiler pressure. The method also includes the step of sizing the conduit so that stoichiometric amounts of steam can be delivered to the conditioning chamber at a linear velocity in the conduit of less than about 12,000 feet per minute measured downstream of the pressure-reduction valve.

In preferred embodiments, quality steam is generated in a steam supply system and delivered to a raw grain composition in a grain conditioning chamber. The steam supply system includes a water-purifier system for providing purified water to the boiler. The boiler is operated at reduced pressure to provide non-superheated steam at the reduced pressure that is delivered through a conduit coupled to the grain conditioning chamber containing the raw grain composition. The conduit further includes a pressure-reduction valve that is selected to minimize the reduction of the steam pressure in the conduit to provide non-superheated steam to the conditioning chamber. The steam generated by the steam supply system is delivered to the conditioning chamber at a low velocity to process the raw grain composition uniformly.

The steam-generating system provides steam that is essentially free of steam-borne contaminants and condensate. A water-purifying system reduces contaminants from the existing water supply and provides purified boiler water to the boiler. Steam generated from purified boiler water is free of steam-borne contaminants, so that steam supplied to the conditioning chamber consists essentially of water vapor saturated steam.

Non-superheated steam is delivered through a conduit to a grain conditioning chamber by operating the boiler at a reduced pressure. Steam of the same quality steam as that generated in the boiler is delivered to the grain conditioning chamber and used to process the raw grain composition. Delivery of this same quality steam is achieved by reducing boiler pressure and minimizing pressure reduction en route to the grain conditioning chamber. The resulting non-superheated steam enables uniform, consistency, hydrothermal processing of the raw grain composition.

Low-velocity steam is delivered to the conditioning chamber by sizing the conduit coupled to the boiler and the grain containing chamber to provide stoichiometric amounts of steam at a rate sufficient to gelatinize and plasticize the raw grain composition being fed substantially continuously into the grain conditioning chamber. The low-velocity steam allows the raw grain composition in the grain conditioning chamber to absorb essentially quantitatively all of the moisture and heat from the steam.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWING

The figure is schematic representation illustrating equipment for generating and delivering stoichiometric amounts of saturated steam to a grain conditioning chamber at a linear velocity in the conduit of less than 12,000 feet per minute in accordance with the present invention.

DETAILED DESCRIPTION OF THE DRAWING

Figure 1:
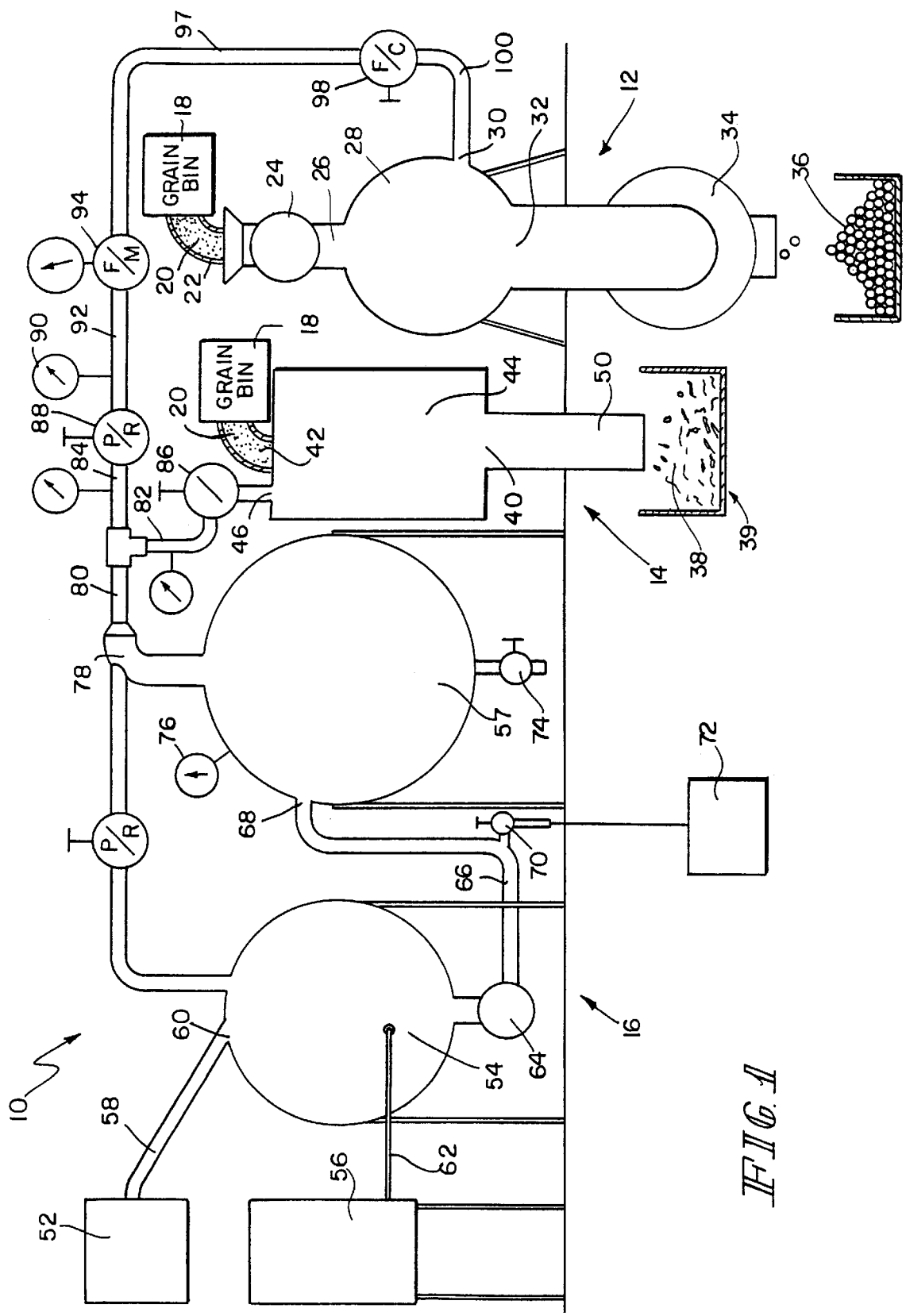

A method and apparatus is provided for supplying quality steam to a raw grain composition in a grain conditioning chamber to process the raw grain composition uniformly and efficiently. Quality steam is generated from using purified boiler water in the boiler to produce steam that is essentially free of steam-borne contaminants and condensate. Non-superheated steam can be delivered to hydrothermally process a raw grain composition fed substantially continuously into the grain conditioning chamber by reducing the boiler pressure and reducing the amount of pressure reduction in the steam conduit between the boiler and the conditioning chamber. Stoichiometric amounts of steam are delivered into the conditioning chamber for the hydrothermal processing of the amounts of raw grain composition being fed in the conditioning chamber at an optimal low velocity by proper sizing of the conduit.

As shown in FIG. 1, system 10 for supplying quality steam to process a raw grain composition includes a pellet-producing processor 12, a flake-producing processor 14, and a steam-supply system 16 coupled to pellet-producing processor 12 and flake-producing processor 14. Steam-supply system 16 operates to provide steam free of steam-borne contaminants. Non-superheated steam is delivered to a raw grain composition in either pellet-producing grain processor 12 through conduits 84, 92, 96, and 100, and or flake-producing grain processor 14 through conduits 82 and 102, at a low velocity. When the raw grain composition is processed with steam supplied in accordance with this invention, the resulting partly-processed grain composition exhibits a more plastic-like texture, is less abrasive to the mill equipment, and can be forced through the mills with lower energy to produce a grain product that is more durable and contains higher available nutritional value.

Pellet-producing processor 12 includes a grain bin 18, a grain feeder 24, a pellet-mill conditioning chamber 28, and a pellet mill 34. Grain bin 18 stores raw grain composition 20, which is delivered through grain conduit 22 to grain feeder 24. Grain feeder 24 conveys raw grain composition 20 through grain inlet 26 of pellet-mill conditioning chamber 28. The raw grain composition is processed in pellet-mill conditioning chamber 28 using steam (not shown) injected from conduit 100 into an interior region of chamber 28 through steam inlet 30 of pellet-mill conditioning chamber 28. Quality steam is used to process the raw grain composition 20 and provide a partly-gelatinized and plasticized grain composition that is conveyed through grain outlet 32 and to pellet mill 34. In pellet mill 34, the partly-processed grain composition is forced through orifices in the pellet-mill die to provide pelletized product 36 that collect in container 37.

Flake-producing grain processor 14 is used to process raw grain composition 20 to provide a flaked product 38 that collects in container 39. Raw grain composition 20 is initially stored in grain bin 40 and delivered through conduits 42 to steam-chest conditioning chamber 44. Steam enters steam-chest conditioning chamber 44 from conduits 82 and 102 through steam inlet 46 to gelatinize and plasticize the raw grain composition to provide a partly-processed grain composition. The partly-processed grain composition exits steam-chest conditioning chamber 44 through grain outlet 48. In flake mill 50, the partly-processed grain composition is forced between two rollers (not shown) to provide a flaked product 38.

Steam supply system 16 includes a water purification system 52, a deaereator tank 54, a chemical tank 56, and a boiler 57. The boiler water is purified before it enters boiler 57 to reduce both the mechanical carryover of steam-borne particulates and the resulting entrainment of small droplets of boiler water or condensate. The steam-borne particulates provide a nucleating surface to condense steam. The amount of steam-borne particulates may be minimized by minimizing the "total dissolved solids" content of the boiler water. The existing water supply is purified in water purifier system and delivered to deaereator tank 54 through a water conduit 58 through tank inlet 60. Oxygen-depleting chemicals, such as hydrazine or sodium sulfite and alkalizers for adjusting the pH of the water, are stored in chemical tank 56 and delivered to deaereator tank 54 through a chemical conduit 62. The water in deaereator tank 54 is heated under about eight pounds per square inch of pressure to provide purified deaereated boiler water at its saturation temperature. The heated, deaereated boiler water is transferred from deaereator tank 54 by a water pump 64 through a conduit 66 to a water inlet 68 on a boiler 57.

The boiler water is sampled using a sampling valve 70, and the boiler water sample is tested daily to ensure that the water purity remains high. The location of the sampling valve 70 may vary depending upon the type of boiler used to generate steam. A fire tube or water tube boiler will have a sampling valve 70 to provide a water (not shown) sample from the reservoir of the water inside boiler 57. However, a steam generator (not shown) will provide a sample valve 70 in a water conduit 66.

A measurement of the electrical conductivity of the water provides a rapid method in accordance with the present invention for checking the contamination in the boiler water in boiler 57. Electrical conductivity of the water sample is a measure of an ability of water to conduct an electrical current and is related to the ionizable dissolved solids in the water. In the present invention, the purity of the boiler water is maintained to provide boiler water having a conductivity less than 3,700 micromhos. A 25 ml. water sample is collected from sampling valve 70, and the electrical conductivity of the water sample is measured by an electrical conductivity tester 72 coupled directly or indirectly to sampling valve 70. The conductivity of the water sample should be below 3,700 micromhos, preferably the conductivity of the water sample should be about 3,200 to about 3,700 micromhos.

If the electrical conductivity of the boiler water is above 3,700 micromhos, the steam-generating equipment is "blown down" through blowdown valve 74. The location of blow-down valve 74 may vary dependent upon boiler 57. A fire tube or water tube boiler provides a blow-down valve 74 at the bottom of the boiler water reservoir; a steam generator generally provides a blow-down valve 74 at the base of an expansion chamber.

Boiler 57 supplies steam to the pellet-mill conditioning chamber 28 and the steam-chest conditioning chamber 44 either singly or simultaneously. The pellet-mill conditioning chamber 28 requires steam at about thirty-five pounds per square inch, while the steam-chest conditioning chamber 44 requires steam at about eighty pounds per square inch. If only the pellet-mill conditioning chamber 28 is used to process a raw grain composition, the boiler 57 can be operated at a lower pressure and provide non-super heated steam to gelatinize the raw gain composition in the pellet-mill conditioning chamber 28. When either the steam-chest conditioning chamber 44 is used alone or simultaneously with the pellet-mill conditioning chamber 28 to process a raw grain composition, boiler 57 is operated at a higher pressure to provide non-super heated steam to gelatinize the raw grain composition in the respective conditioning chamber. Preferably, boiler 57 is operated at a pressure less than one hundred pounds per square inch to supply non-super heated steam to the conditioning chambers. More preferably, boiler 57 is maintained to provide steam at less than eighty pounds per square inch. A pressure gauge 76 on boiler 57 displays the steam pressure inside the boiler. Alternatively, pressure gauge 76 is located on main steam header 78 or on steam conduit 80. The location of pressure gauge 76 is not critical provided that pressure gauge 76 accurately displays steam pressure inside the boiler.

Quality steam prepared in accordance with the present invention is delivered to steam-chest conditioning chamber 44 to process a raw grain composition 20 through main steam header 78 and through steam conduit 80. Steam conduit 80 branches into steam conduit 82 and steam conduit 84. Steam conduits 82 and 102 are in steam flow communication with steam-chest conditioning chamber 44. Steam shutoff valve 86 is located between steam conduit 82 and conduit 102 to shut off the supply of steam to steam-chest conditioning chamber 44.

Conduits 84, 92, 96 and 100 provide steam flow communication between the main steam header 78 and pellet-mill conditioning chamber 28. Pressure-reduction valve 88 located at a junction between steam conduits 84 and 92 reduces the steam pressure from about one hundred pounds per square inch (or less) to about thirty-five pounds per square inch. Pressure-reduction valve 88 is selected to provide saturated steam to pellet-mill conditioning chamber 28. The saturated steam can be provided by correctly selecting pressure-reduction valve 88 to reduce the value of the steam pressure in steam conduit 84 to a value that is no less than 30% of the boiler pressure. Preferably, the pressure-reduction valve 88 is selected to reduce the pressure in steam conduit to a value no less than 40% of the boiler pressure. More preferably, pressure-reduction valve 88 is selected to reduce the pressure in the steam conduit to a value no less than 50% of the boiler pressure. Most preferably, the pressure-reduction valve 88 is selected to reduce the pressure in conduit 84 to a value no less than 60% of the boiler pressure. Second pressure gauge 90 located downstream of pressure-reduction valve 88 displays the steam pressure in steam conduit 92.

Steam conduit 80, 84, 92, 96 and 100 are sized to deliver a stoichiometric amount of low velocity steam to pellet-mill conditioning chamber 28. Preferably, steam conduits 80 and 102 and conduits 82, 84, 92, 96 and 100 are sized to deliver steam to the conditioning chamber at a velocity of about 8,000 to about 12,000 feet per minute. Flow meter 94 located downstream of pressure-reduction valve 88 in steam conduit 92 displays the rate of steam delivered through the meter in pounds of steam per hour. The size of the conduits are calculated by determining the stoichiometric amount of steam needed per hour to process the raw grain composition delivered to the chamber and referring to standard steam tables to ascertain the pipe size necessary to deliver that amount of steam per hour at the specified temperature, pressure, and velocity. For example, a cylindrical pellet-mill conditioning chamber having dimensions of about 8 to about 12 feet in length and about 12 to about 24 inches in diameter and coupled to a pellet mill drive rated for about 150 to about 225 horsepower can process a raw grain composition at a rate of about 18 to about 24 tons per hour. Generally, about 100 to about 200 pounds of steam are needed to process each ton of raw grain composition. Thus, the range of stoichiometric amounts of steam for processing a raw grain composition in this pellet-mill conditioning chambers is about 1,800 pounds to about 4,800 pounds of steam per hour. Standard steam tables can be consulted to determine that a three inch diameter pipe is needed to deliver about 1,800 to about 4,800 lbs. of steam per hour at a linear velocity of about 8,000 to about 12,000 feet per minute.

Flow-control valve 98 located in steam conduit 96 downstream of steam flow meter 94 controls the flow of steam into pellet-mill conditioning chamber 28. Flow-control valve 98 allows steam to enter the steam inlet 30 and then into pellet-mill conditioning chamber 28.

Quality steam can be supplied to process raw grain composition in a conditioning chamber by carefully controlling the certain key parameters. Water vapor saturated steam is generated in a boiler 57 using purified boiler water. Purifying the boiler water removes steam-borne contaminants. Non-superheated steam is supplied by reducing the operating pressure of the boiler and by reducing the amount of pressure drops of steam en route to the conditioning chamber. Low-velocity steam is delivered through conduits connecting the boiler to the conditioning chamber by sizing the conduit to provide a stoichiometric amount of steam at a constant rate that is sufficient to process the grain composition progressing through the conditioning chamber.

For the purpose of defining this invention, the term "stoichiometric amounts of steam" refers to the amount of saturated steam produced in accordance with this invention as required for optimum processing of the raw grain composition. In practice, the stoichiometric amount of steam will vary upon the nature of the raw grain composition undergoing processing in the conditioning chamber. Stoichiometric amounts of steam can range from about 100 to about 200 pounds of steam per ton of raw feed, or more preferably from about 140 to about 160 pounds of steam per ton of raw feed, for the production of pelletized feed. The stoichiometric amount of steam for processing corn in a steam chest for a flaking mill can range from about 250 to about 350 pounds of steam per ton of corn, more typically about 300 pounds of steam per ton of corn processed in a steam chest. A flow-control valve may be used to control the stoichiometric amount of quality steam that is required for optimum processing of the raw grain composition.

Saturated steam is defined, for the purposes of this invention, as steam at its saturation temperature: that is the temperature at which the water boils at a specified pressure. Saturated steam consists essentially of 100% water vapor.

To provide steam in accordance with this invention, the boiler water must be sufficiently pure to reduce both the mechanical carryover of steam-borne particulates and the resulting entrainment of small droplets of boiler water or condensate. Water purification system 52 must take into account the requirements of the boiler and related steam generating equipment and the contaminants of the existing water supply. Water purification methods involve several steps. First, the water is filtered to remove suspended solids. In addition, the water may be filtered through activated charcoal filters to remove trace organic materials and chlorine. Then the water is demineralized by filtering through a zeolite resin bed to remove calcium and magnesium salts. After most of the containments have been removed, the pH of the water may need to be adjusted. Typically, the pH of a fire tube or a water tube boiler is maintained between about 8 to about 9.5; but the particular steam-generating equipment may require that the pH of the boiler water be either higher or lower than about 8.5 to 9.5. For example, a Clayton Steam Generator requires that the pH of the boiler water be maintained at about 10.5 to about 11.5. The pH of the boiler water may be adjusted by adding volatile alkalizers such as ammonia, morpholine, or hydrazine from chemical tank 56 to the water. Before the water is introduced into the boiler 57, the water is deaerated by heating the water to its saturation temperature and/or adding oxygen depleting chemicals such as sodium sulfite or hydrazine to the water. Finally, steam condensate from condensation traps may be a source of high purity water that can be recycled to the boiler.

Preferably, the boiler water is sampled and tested daily to insure that the boiler water purity remains high. Measuring the electrical conductivity of the water sample provides a rapid means of checking the purity in the boiler water. Sampling valve 70 is used to collect a boiler water sample. The water sample is buffered to a pH of about 1.5 to about 2.0 and the electrical conductivity of the buffered water sample is measured. The electrical conductivity of water is a measure of its ability to conduct an electrical current and is related to the amount of dissolved ionizable solids in the water. In the present invention, the total dissolved solids content of the boiler water is reduced to provide boiler water having an electrical conductivity of less than 3,700 micromhos. More preferably, the total dissolved solids content of the boiler water is reduced to provide boiler water having a conductivity of about 3,200 to about 3,700 micromhos.

In addition to measuring the electrical conductivity of the boiler water, the pH, dissolved oxygen content, and hardness of the boiler water is measured. The pH of the boiler water is determined by titration of the water sample with a stock sulfuric acid solution using phenolphthalein as an indicator. If the pH of the boiler water may be adjusted by adjusting the amount of alkalizers added from the chemical tank 56 to deaereator tank 54. The dissolved oxygen content of the water is determined by ASTM D1339-72 Method 377.1. If the amount of dissolved oxygen in the boiler water is too high, the amount of oxygen-depleting chemicals added from the chemical tank 56 to the deaereator tank 54 is increased. The hardness of the boiler water is determined according to ASTM D812 Method B and Vanadomolybdophosphoric Acid Colorimetric Method (Ind. Eng. Chem Anal. Ed. 16: 371 (1964)).

It is preferable that the steam-generating equipment be maintained regularly to insure that the boiler water purity is maintained. The maintenance schedule will be dictated by the individual characteristics of the particular steam-generating equipment and the purity of the boiler water. Generally, the boiler and/or related equipment such as an expansion chamber are "blown down" to remove contaminants in the steam-generating equipment as part of a regularly scheduled maintenance procedure. If the electrical conductivity of the boiler water is too high, the boiler and related equipment are "blown down" to remove the contaminants. This procedure is continued until the electrical conductivity of the boiler water is less than about 3,700 micromhos.

Maintaining the boiler water purity in accordance with the present invention, provides steam to process a raw grain composition more uniformly. The resulting partly-processed grain composition provides a feed product that is more digestible and has an increased nutritional value. It is well known that steam contains a greater amount of energy per unit mass than hot water or condensate at about the same temperature and unless a starch-containing material, such as the raw grain composition, is heated sufficiently, the starch-containing material does not absorb sufficient moisture to gelatinize the starch granules. Conversely, if too much heat is supplied to a starch-containing material, many of the important nutrients such as vitamins are destroyed. Reduction of the total dissolved solids content in the boiler feed water reduces the amount of steam-borne contaminants particularly condensate in the steam. Thus, it is thought that when steam delivered in accordance with this invention contacts the raw grain composition, the individual grain particles absorb the moisture to process the raw grain composition more thoroughly and uniformly hydrothermally without destroying important nutrients.

The boiler pressure should be maintained at less than one hundred pounds per square inch. Maintaining the boiler pressure at greater than one hundred pounds per square inch and then reducing the steam pressure to about thirty-five pounds per square inch or lower, significantly changes the velocity, temperature, and moisture content of the steam. The steam becomes superheated, contains less moisture, and can overheat the raw grain composition destroying many of the important grain nutrients. The resulting partly-processed grain composition is insufficiently plastic to be forced easily through the mills, and the nutritional value of the resulting feed product is reduced.

The boiler 57 can be operated at a lower pressure to provide saturated steam that has sufficient heat and moisture to process a raw grain composition. When a boiler 57 is operated at a pressure of one hundred pounds per square inch (or less), the raw grain composition is heated to a sufficiently high temperature to absorb essentially all the moisture from the saturated steam. Furthermore, operating a boiler at lower pressure lengthens the usable life span of a boiler and the related steam generating equipment. Typically, a steam-chest conditioning chamber requires steam at about eighty pounds per square inch to about one hundred pounds per square inch while a pellet-mill conditioning chamber requires steam at about thirty-five pounds per square inch. When the boiler is operated at one hundred pounds per square inch or less, or more preferably at about eighty pounds per square inch, the same boiler can simultaneously supply steam to both types of conditioning chambers. Steam at about eighty pounds per square inch can be injected into the steam chest through conduits 82 and 102, and the steam pressure in conduits 92, 96, and 100 can be reduced to about thirty-five pounds per square inch before it is injected into the pellet-mill conditioning chamber. When only the pellet-mill conditioning chamber is being used to process a raw grain composition, the boiler may be maintained at still lower pressure, preferably the boiler can be maintained about fifty-five to about sixty-five pounds per square inch.

Non-superheated steam is delivered to the raw grain composition in the conditioning chamber by reducing the pressure drops of steam en route to the conditioning chamber. The steam pressure in the conduit is reduced to a value that is no less than about 30% of the boiler pressure. Ideally, the steam pressure in the conduit is maintained at about the same pressure as the boiler pressure to provide saturated steam to the conditioning chamber. For example, steam is typically delivered to a steam-chest conditioning chamber containing whole grain kernels at about eighty pounds per square inch, and the boiler can be maintained at about eighty pounds per square inch to match the desired pressure for the steam chest. However since steam is delivered to a pellet-mill conditioning chamber at about thirty-five pounds per square inch, the steam pressure in the conduit must be reduced to no less than 30% of the boiler pressure before it is delivered to the pellet-mill conditioning chamber. The steam pressure in the conduit may be controlled by correctly selecting a pressure-reduction valve 88. The pressure-reduction valve 88 is selected to reduce the pressure in the conduit to a value of no less than about 30% of the boiler pressure. Preferably, the pressure-reduction valve 88 is selected to reduce the steam pressure in the conduit to a value of no less than about 40% of the boiler pressure; more preferably, the pressure-reduction valve 88 is selected to reduce the steam pressure in the conduit to a value of no less than about 50% of the boiler pressure. Most preferably, the pressure-reduction valve is selected to reduce the steam pressure in the steam conduit to a value of no less than about 60% of the boiler pressure. Boiler 57 may be operated at a pressure of about fifty-five to about sixty-five pounds per square inch, and the pressure in the conduits 84, 92, 96 and 100 may be reduced to about thirty-five pounds per square inch before the steam is delivered to a pellet-mill conditioning chamber to process a raw grain composition.

Low-velocity steam is delivered to the conditioning chamber by increasing the diameter of the conduit between the boiler and the conditioning chamber. A stoichiometric amount of steam is delivered to the conditioning chamber at a linear velocity in the conduit of less than about 12,000 feet per minute. When the steam enters the conditioning chamber at a high velocity, it passes over and around the raw grain composition, but it does not fully penetrate the grain particles in the raw grain composition before the steam vents into the atmosphere. When the steam velocity is reduced in accordance with the present invention, the grain particles absorb essentially all of the heat and moisture from the steam. In the present invention, the conduit is sized to deliver a stoichiometric amount of steam to the conditioning chamber at a linear velocity in the conduit of less than about 12,000 feet per minute. More preferably, the steam conduit is sized to deliver a stoichiometric amount of steam in the conditioning chamber at a linear velocity of about 8,000 to about 12,000 feet per minute. The velocity of steam may be reduced by increasing the diameter of the conduit with little or no increase in production costs-excluding the cost of replacing the existing steam conduits and valves. Furthermore, since the lower steam velocity allows the grain composition to absorb essentially all the steam, very little, if any, steam is vented into the atmosphere and wasted.

The stoichiometric amount of steam at linear velocity of about 8,000 to about 12,000 feet per minute is continuously injected into the conditioning chamber at a sufficient rate, typically measured in pounds of steam per hour, to hydrothermally process the raw grain composition that progresses through the conditioning chamber. Ideally, the rate of steam consumption, as determined by the rate steam is injected into the conditioning chamber, remains constant after initial startup for optimum processing of a raw grain composition.

In addition to the use of specifically selected pressure-reduction valves, correctly sized and located steam traps in the steam conduit reduces the amount of condensate in the steam conduit. Steam traps may be used in conjunction with steam separators to effectively remove the condensate from the steam. To operate effectively the steam traps must be maintained as an integral part of the steam generating equipment. The condensate from the steam traps is essentially distilled water and may be recycled to the boiler as purified hot water to increase the boiler efficiency.

The production costs decrease while the throughput of the grain processing equipment and feed product quality increases by controlling the boiler water purity, maintaining the boiler pressure at less than one hundred pounds per square inch, reducing the steam pressure to a value no less than about 30% of the boiler pressure and delivering a stoichiometric amount of steam at a velocity less than 12,000 feet per minute through an conduit to the conditioning chamber. The raw grain composition is homogeneously gelatinized and the resulting partly-processed grain composition exhibits a more plastic-like texture that is less abrasive to the mill equipment and can be forced through the pellet mill or the flaking mill with lower energy. The resulting feed product is more durable, does not produce fines and does not need the addition of a binder such as lignite or dentinite. The resulting feed product is a higher quality product that contains a higher available nutritional value that is more readily digested by animals and humans.

Although the invention has been described in detail with reference to certain preferred embodiments, variations and modifications exist within the scope and the spirit of the invention as described and defined in the following claims.

We claim:

1. A method for hydrothermal processing of a raw grain composition for production of food or animal feeds, the method comprising the steps of feeding a raw grain composition into a conditioning chamber and contacting the composition with stoichiometric amounts of steam produced from boiler water in a boiler and delivered through a conduit, a pressure-reduction valve, and a steam inlet on the conditioning chamber, selecting the pressure-reduction valve to reduce the pressure in the conduit downstream of said valve to a value no less than 30% of the boiler pressure, and sizing the conduit so that stoichiometric amounts of steam can be delivered to the conditioning chamber at a linear velocity in the conduit of about 8,000 to about 12,000 feet per minute measured downstream of the pressure-reduction valve.

2. The method of claim 1, further comprising the step of purifying the boiler water to provide boiler water having a conductivity less than 3,700 micromhos.

3. The method of claim 1, further comprising the step of purifying the boiler water to provide boiler water having a conductivity of about 3,200 to about 3,700 micromhos.

4. The method of claim 1, further comprising the step of maintaining the boiler at a steam pressure of less than one hundred pounds per square inch.

5. The method of claim 1, further comprising the step of maintaining the boiler at a steam pressure of about fifty-five to about eighty pounds per square inch.

6. A method for hydrothermal processing of a grain composition for production of food or animal feeds, the method comprising the steps of feeding a raw grain composition into a conditioning chamber and contacting the composition with stoichiometric amounts of steam produced from boiler water in a boiler and delivered through a conduit, a pressure-reduction valve, and a steam inlet on the conditioning chamber, purifying the boiler water to provide boiler water having an electrical conductivity less than about 3,700 micromhos, and sizing the conduit so that the stoichiometric amounts of steam can be delivered to the conditioning chamber at a linear velocity in the conduit of about 8,000 to about 12,000 feet per minute measured downstream of the pressure-reduction valve.

7. The method of claim 6, wherein the pressure-reduction valve is configured to reduce the pressure in the conduit downstream of said valve to a value no less than 30% of the boiler pressure.

8. The method of claim 6, wherein the pressure-reduction valve is configured to reduce the pressure in the conduit downstream of said valve to a value no less than 40% of the boiler pressure.

9. The method of claim 6, wherein the pressure-reduction valve is configured to reduce the pressure in the conduit downstream of said valve to a value no less than 50% of the boiler pressure.

10. The method of claim 6, wherein the pressure-reduction valve is configured to reduce the pressure in the conduit downstream of said valve to a value no less than 60% of the boiler pressure.

11. A method for hydrothermal processing of a grain composition for production of food or animal feeds, the method comprising the steps of contacting a raw grain composition in a conditioning chamber with steam produced from boiler water in a boiler and delivered through a conduit including a pressure-reduction valve to a steam inlet on the conditioning chamber, maintaining the boiler at a steam pressure of less than one hundred pounds per square inch, purifying the boiler water to provide boiler water having an electrical conductivity less than about 3,700 micromhos, and sizing the conduit so that stoichiometric amounts of steam can be delivered to the conditioning chamber at a linear velocity in the conduit of about 8,000 to about 12,000 feet per minute measured downstream of the pressure-reduction valve.

12. The method of claim 11, wherein the pressure-reduction valve is configured to reduce the pressure in the conduit downstream of said valve to a value no less than 30% of the boiler pressure.

13. The method of claim 12, wherein the pressure-reduction valve is configured to reduce the pressure in the conduit downstream of said valve to a value no less than 40% of the boiler pressure.

14. The method of claim 12, wherein the pressure-reduction valve is configured to reduce the pressure in the conduit downstream of said valve to a value no less than 50% of the boiler pressure.

15. The method of claim 12, wherein the pressure-reduction valve is configured to reduce the pressure in the conduit downstream of said valve to a value no less than 60% of the boiler pressure.

16. The method of claim 12, wherein the boiler is maintained at a steam pressure of about fifty-five to about eighty pounds per square inch.

17. The method of claim 12, wherein the step of purifying the boiler water provides boiler water having a conductivity of about 3,200 to about 3,700 micromhos.

18. The method of claim 17, wherein the pressure-reduction valve is configured to reduce the pressure in the conduit downstream of said valve to a value no less than 30% of the boiler pressure.

19. The method of claim 17, wherein the pressure-reduction valve is configured to reduce the pressure in the conduit downstream of said valve to a value no less than 40% of the boiler pressure.

20. The method of claim 17, wherein the pressure-reduction valve is configured to reduce the pressure in the conduit downstream of said valve to a value no less than 50% of the boiler pressure.

21. The method of claim 17, wherein the pressure-reduction valve is configured to reduce the pressure in the conduit downstream of said valve to a value no less than 60% of the boiler pressure.

22. The method of claim 17, wherein the boiler is maintained at a steam pressure of about fifty-five to about eighty pounds per square inch.

23. The method of claim 11, wherein the pressure-reduction valve is configured to reduce the pressure in the conduit downstream of said valve to a value no less than 30% of the boiler pressure.

24. The method of claim 11, wherein the pressure-reduction valve is configured to reduce the pressure in the conduit downstream of said valve to a value no less than 40% of the boiler pressure.

25. The method of claim 11, wherein the pressure-reduction valve is configured to reduce the pressure in the conduit downstream of said valve to a value no less than 50% of the boiler pressure.

26. The method of claim 11, wherein the pressure-reduction valve is configured to reduce the pressure in the conduit downstream of said valve to a value no less than 60% of the boiler pressure.

27. The method of claim 11, wherein the total dissolved solids content in the boiler water is reduced to provide boiler water having a conductivity of about 3,200 to about 3,700 micromhos.

28. A method for hydrothermal processing of a grain composition for production of food or animal feeds, the method comprising the steps of contacting a raw grain composition in a conditioning chamber with steam produced from boiler water in a boiler and delivered through a conduit and through a steam inlet on the conditioning chamber, maintaining the boiler at a steam pressure of less than one hundred pounds per square inch, purifying the boiler water to provide boiler water having an electrical conductivity less than about 3,700 micromhos, and sizing the conduit so that stoichiometric amounts of steam can be delivered to the conditioning chamber at a linear velocity in the conduit of about 8,000 to about 12,000 feet per minute.

29. The method of claim 28, wherein the boiler water is purified to provide boiler water having a conductivity of about 3,200 to about 3,700 micromhos.

30. A method for hydrothermal processing of a grain composition for production of food or animal feeds, the method comprising the steps of contacting a raw grain composition in a conditioning chamber with steam produced from boiler water in a boiler and delivered through a conduit into the conditioning chamber containing the raw grain composition, and providing a stoichiometric amount of saturated steam at a temperature of about 280° to about 350° F. through a conduit sized to deliver the stoichiometric amount of saturated steam at a velocity of about 8,000 to about 12,000 feet per minute to the conditioning chamber containing the raw grain composition.

31. The method of claim 30, wherein the boiler is operated at a pressure of less than one hundred pounds per square inch.

32. The method of claim 31, further comprising the step of controlling total dissolved solids content in the boiler water to provide boiler water having an electrical conductivity of less than 3,700 micromhos.

33. The method of claim 30, wherein the conduit includes a pressure-reduction valve configured to reduce the pressure in the conduit downstream of said valve to a value no less than 30% of the boiler pressure.

34. The method of claim 33, wherein the pressure-reduction valve configured to reduce the pressure in the conduit downstream of said valve to a value no less than 40% of the boiler pressure.

35. The method of claim 33, wherein the pressure-reduction valve configured to reduce the pressure in the conduit downstream of said valve to a value no less than 50% of the boiler pressure.

36. The method of claim 33, wherein the pressure-reduction valve configured to reduce the pressure in the conduit downstream of said valve to a value no less than 60% of the boiler pressure.

37. A continuous method for hydrothermal processing of a raw grain composition for production of food or animal feeds, wherein a raw grain composition is continuously delivered to a conditioning chamber and a stoichiometric amount of steam is continuously delivered from a boiler through a steam conduit and injected into the chamber to contact and hydrothermally process the raw grain composition, and wherein the injected steam is saturated steam at a temperature of about 280° to about 350° F. and the conduit is sized so that a stoichiometric amount of steam can be delivered through the conduit at a velocity of about 8,000 to about 12,000 feet per minute.

38. A method for continuous hydrothermal processing of a raw grain composition for production of food or animal feeds, the method comprising the steps of conveying the raw grain composition into the conditioning chamber at a predetermined feed rate, and injecting a stoichiometric amount of steam into the conditioning chamber to contact and hydrothermally process the raw grain composition, wherein said steam is saturated steam at a temperature of about 280° to about 350° F. and is delivered to the conditioning chamber through a conduit sized to deliver the stoichiometric amount of steam at a rate sufficient to process the raw grain composition at the predetermined rate of feed at a linear velocity in the conduit of about 8,000 to about 12,000 feet per minute.

* * * * *